United States Patent Office 2,721,350
Patented Oct. 25, 1955

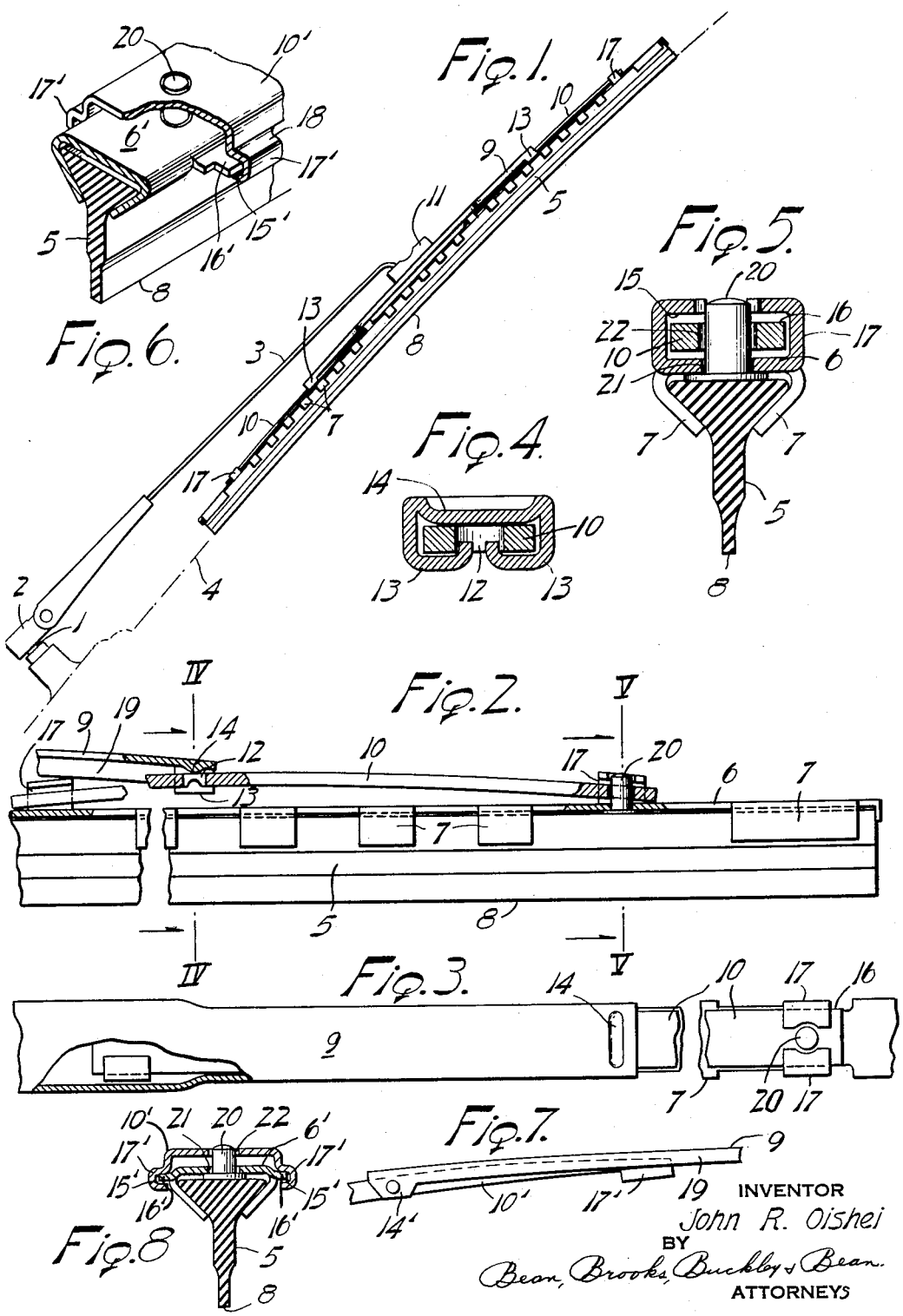

2,721,350

WINDSHIELD WIPER

John R. Oishei, Buffalo, N. Y., assignor to Trico Products Corporation, Buffalo, N. Y.

Application October 28, 1949, Serial No. 124,101

3 Claims. (Cl. 15—245)

This invention relates to the windshield cleaning art and more especially to a wiper or blade unit of the cleaning mechanism.

The recent advent of the curved windshield has brought with it a surface conforming wiper in which the actuating arm pressure is distributed to the wiping edge at longitudinally spaced points through a flexible superstructure or frame work comprising a primary yoke and pivotally connected secondary yokes with the former being connected to the actuating arm and the latter joined to the blade body.

The object of this invention is to simplify the attachment of the blade body to the yoke-like superstructure or frame which will facilitate and expedite the mounting and demounting of the body and thereby make a practical wiper of economical design.

Again, the invention will be found to reside in a novel interlocking structure which will enable the related parts of the pressure distributing frame and the blade or wiper to be formed and shaped by simple stamping and die operations.

The foregoing and other objects will manifest themselves as this description progresses, reference being made therein to the accompanying drawing, wherein Fig. 1 is a side elevation of the improved wiper as applied to a windshield;

Fig. 2 is a fragmentary side view of the wiper with portions broken away for clarity;

Fig. 3 is a fragmentary plan view of the wiper;

Figs. 4 and 5 are cross sectional views of the wiper as viewed about on lines 4—4 and 5—5, respectively, of Fig. 2;

Fig. 6 is a fragmentary perspective view of a modified embodiment; and

Figs. 7 and 8 are, respectively, a side elevation, in fragment, and a transverse sectional showing of the modification.

Referring more particularly to the drawing, the numeral 1 designates the power or drive shaft for the windshield cleaning mechanism, and 2 the wiper actuating arm which has an outer end section 3 under a spring urge toward the windshield glass surface 4.

The wiper body 5, in the form of an elongate blade, is preferably elastic and supported by a backing 6 which is flexible toward the surface being wiped. It may be retained on the body by its fingers 7 which straddle and embrace the body in a manner to enable the latter to conform to changes in the surface contour of the windshield. The fingers impart a channeled shape to the backing or holder for the squeegee element 5.

The wiper body 5 and its supporting backing 6 are provided with a flexible superstructure by which the arm spring urge is distributed effectively to the wiping edge 8 for its wiping contact with the windshield glass. Such superstructure comprises a flexible frame in the form of a primary yoke 9 and plural secondary yokes 10, the former being provided with arm attaching means 11 and the latter being connected to the backing at longitudinally spaced points. Intermediate its ends each secondary yoke is connected to a respective terminal of the primary yoke, as by forming an opening 12 in one and having ears 13 on the other wrapped about the cooperating yoke to hold them together. The ears are engaged in the opening to preclude interlock with the opposite sides thereof as longitudinally spaced shoulders and thereby relative longitudinal movement while permitting pivotal or rocking movement of the secondary on the primary, a transverse rib 14 being pressed from one yoke on which the cooperating yoke may so fulcrum, or a pin 14' in the form of a rivet, Fig. 7, may be provided.

The longitudinally spaced points of connection between the secondary yokes and the wiping body, or its backing, afford limited relative movement in order to permit the surface conforming flexibility of the wiping edge. For this purpose the opposite ends of the secondary yoke are slidably connected to the backing, as by having opposed seats on one element slidably receiving the opposite edge portions of the other. In Figs. 2 and 5, the opposed seats 15 are carried by the backing to receive the edges 16 on the secondary yoke, while in the embodiment of Figs. 6, 7 and 8 the opposed seats 15' are carried by the secondary yoke to receive the edges 16' on the backing 6'. The seats 15 are formed by turning upwardly and over the oppositely projecting ears 17 on the backing for slidably receiving the ends of the secondary yoke therebetween. The seats 15' are formed in the ears 17' at the opposite side of each terminal of the secondary yoke 10'. In one embodiment the secondaries are strap-like in cross section for complete nesting in the channeled primary yoke; in the other embodiment the secondaries are of channeled cross section but nevertheless capable of being fully nested within the channeled primary by reason of the fact that the ears 17' are offset at 18 below the side walls 19 of the primary yoke. This nesting enables maximum surface conformance and a low setting superstructure. It further locates the points of support for the flexible backing laterally beyond the sides of the primary yoke and substantially within or immediately adjacent the transverse plane of the lowermost end portions of the secondary yokes to effectively resist the torque developed in the wiping body as it moves back and forth on the windshield surface. These points of support are rigid with the secondary yokes and consequently the developed torque is transmitted lengthwise of the latter with a minimum twist upon the pivotal mountings 13, 14 of such secondary yokes. In the second embodiment, the opposite edges 16' may be reduced in length to form in effect narrow lateral tongues, Fig. 6, in contrast to the longer side edges or tongues of the first embodiment, Fig. 3. In both forms the seats are in the form of opposed grooves. Whenever the wiping edge follows changes in surface contour the tongues will play or slide in their seats to accommodate the needed adjustment. To preclude lengthwise displacement of the tongues from their seats, a detent 20 is provided to connect one secondary yoke to the backing. As shown, the detent is carried by the backing element, the same protruding through a hole 21 therein to engage a second aperture 22 in the overlying secondary yoke. To disengage the detent the same is depressed against the resiliency of the wiper body. Only one detent is required to lock the superstructure on the blade body. The tongue and groove interlock provides a simple mode of uniting the blade body on the pressure distributing frame which is practical and one tending toward economy in manufacture.

While the foregoing description has been given in detail it is without thought of limitation since the inventive principles involved are capable of assuming other physical

What is claimed is:

1. A wiper for a curved windshield surface comprising a flexible elongate body, a primary yoke having provision for arm attachment and also having an end portion formed with a transverse rib on its underside, a secondary yoke rockably mounted intermediate its ends on the transverse rib and having its opposite ends operatively connected to the elongate body, one of said yokes having transversely spaced ears straddling the other yoke and the latter having spaced shoulder portions, said ears being bent over said other yoke to lie between said shoulder portions for rockably securing the yokes together to relatively pivot toward and from each other, and means operatively connecting the opposite end of the primary yoke to the elongate body for coacting with the secondary yoke in applying pressure to conform the elongate body to the surface being wiped.

2. A wiper for a curved windshield surface comprising a flexible elongate body, a primary yoke having provision for arm attachment and also oppositely extending end portions each formed with a transverse rib, a secondary yoke rockably mounted on the transverse rib of each end portion and having longitudinally spaced shoulders thereat and its opposite ends flexibly connected to the elongate body, and transversely spaced ears carried by each end portion of the primary yoke in straddling relation to the adjacent secondary yoke and bent over the latter to lie between said spaced shoulders for rockably securing the secondary yoke to the respective transverse rib against longitudinal displacement from the primary yoke.

3. A wiper for a curved windshield surface comprising a flexible elongate body, a primary yoke having provisions for arm attachment and also oppositely extending end portions each formed with a transverse rib, a secondary yoke rockably mounted on the transverse rib of each end portion and having an opening directly beneath the respective rib, and transversely spaced ears carried by each end portion of the primary yoke in straddling relation to the adjacent secondary yoke and bent over the latter and into its opening.

References Cited in the file of this patent

UNITED STATES PATENTS

| | | |
|---|---|---|
| 1,953,635 | Rose | Apr. 3, 1934 |
| 2,087,178 | Zaiger | July 13, 1937 |
| 2,276,556 | Zaiger | Mar. 17, 1942 |
| 2,596,063 | Anderson | May 6, 1952 |

FOREIGN PATENTS

| | | |
|---|---|---|
| 433,467 | Great Britain | Aug. 15, 1935 |

OTHER REFERENCES

Anderson Publication, The Anderson Co., Gary, Indiana (Nov. 1, 1946).